United States Patent
Sugiura

(10) Patent No.: US 11,148,639 B2
(45) Date of Patent: Oct. 19, 2021

(54) ELECTROSTATIC SENSOR AND VEHICLE OPENING AND CLOSING DEVICE

(71) Applicant: AISIN SEIKI KABUSHIKI KAISHA, Kariya (JP)

(72) Inventor: Takehiko Sugiura, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 176 days.

(21) Appl. No.: 16/472,543

(22) PCT Filed: Aug. 31, 2017

(86) PCT No.: PCT/JP2017/031354
§ 371 (c)(1),
(2) Date: Jun. 21, 2019

(87) PCT Pub. No.: WO2018/123142
PCT Pub. Date: Jul. 5, 2018

(65) Prior Publication Data
US 2021/0129794 A1  May 6, 2021

(30) Foreign Application Priority Data
Dec. 26, 2016 (JP) .............................. JP2016-251936

(51) Int. Cl.
*B60R 25/20* (2013.01)
*G01V 3/08* (2006.01)

(52) U.S. Cl.
CPC .......... *B60R 25/2054* (2013.01); *G01V 3/088* (2013.01)

(58) Field of Classification Search
None
See application file for complete search history.

(56) References Cited

U.S. PATENT DOCUMENTS

2013/0131917 A1  5/2013  Fuchs et al.
2013/0234828 A1  9/2013  Holzberg et al.
(Continued)

FOREIGN PATENT DOCUMENTS

DE  10 2010 060 364 A1  5/2012
JP     2005-133529 A     5/2005
(Continued)

OTHER PUBLICATIONS

International Search Report dated Nov. 28, 2017 in PCT/JP2017/031354 filed on Aug. 31, 2017.
(Continued)

*Primary Examiner* — Jas A Sanghera
(74) *Attorney, Agent, or Firm* — Oblon, McClelland, Maier & Neustadt, L.L.P.

(57) ABSTRACT

This electrostatic sensor is provided with an upper electrode provided in a lower part of a vehicle, a lower electrode provided in the lower part of the vehicle so as to be positioned below the upper electrode, and a detection unit for detecting whether there has been an operation consisting of the moving in and out of a foot below the vehicle on the basis of capacitance variation in the upper electrode and lower electrode. The detection unit determines that the operation consisting of the moving in and out of a foot has occurred if the time when the peak capacitance of the upper electrode is reached and the time when the peak capacitance of the lower electrode is reached match.

7 Claims, 6 Drawing Sheets

(56) References Cited

U.S. PATENT DOCUMENTS

| | | | |
|---|---|---|---|
| 2014/0070920 A1 | 3/2014 | Elie et al. | |
| 2014/0195073 A1* | 7/2014 | Herthan | B60R 25/2045 |
| | | | 701/2 |
| 2014/0324273 A1 | 10/2014 | Russ et al. | |
| 2015/0025751 A1 | 1/2015 | Sugiura et al. | |
| 2015/0176324 A1* | 6/2015 | Ebert | E05F 15/73 |
| | | | 701/49 |
| 2019/0242176 A1* | 8/2019 | Nihei | E05F 15/76 |

FOREIGN PATENT DOCUMENTS

| | | |
|---|---|---|
| JP | 2015-21238 A | 2/2015 |
| JP | 2015-507385 A | 3/2015 |
| JP | 2016-141312 A | 8/2016 |
| JP | 2016-142075 A | 8/2016 |
| WO | WO 2011/113552 A1 | 9/2011 |

OTHER PUBLICATIONS

German Office Action issued in German Patent Application No. 11 2017 006 538.0 dated Jun. 9, 2021 (w/ English translation).

\* cited by examiner

ELECTROSTATIC SENSOR AND VEHICLE OPENING AND CLOSING DEVICE

TECHNICAL FIELD

The present invention relates to an electrostatic sensor and a vehicle opening and closing device.

BACKGROUND ART

An electrostatic sensor detects a detection subject such as a human body proximate to the electrostatic sensor through a change in capacitance.
An electrostatic sensor disclosed in Patent Document 1 includes two electrodes arranged at a lower portion of a vehicle. The controller of the electrostatic sensor determines whether a foot-in-and-out operation has been performed under the vehicle through the detection of a change in the capacitance detected by the two electrodes. When a foot-in-and-out operation has been performed under the vehicle, the back door of the vehicle opens or closes.

PRIOR ART DOCUMENT

Patent Document

Patent Document 1: WO 2011113552

SUMMARY OF THE INVENTION

Problems that the Invention is to Solve

Electrostatic sensors are easily affected by water. However, the electrostatic sensor of Patent Document 1 does not take into consideration the influence of water that wets a vehicle. More specifically, when rain or the like causes water to wet the lower portion of the vehicle, the capacitance at the two electrodes changes. This may result in an erroneous determination that a foot-in-and-out operation has been performed and open or close the back door.
It is an object of the present invention to provide an electrostatic sensor and a vehicle opening and closing device that allow for easy detection of a foot-in-and-out operation regardless of the environment.

Means for Solving the Problems

An electrostatic sensor that achieves the above object includes an upper electrode arranged at a lower portion of a vehicle; a lower electrode arranged at the lower portion of the vehicle so as to be located downward in a gravitational direction from the upper electrode; and a detector configured to detect whether a foot-in-and-out operation is performed under the vehicle based on changes in capacitances at the upper electrode and the lower electrode. The detector is configured to determine that the foot-in-and-out operation has been performed when a time at which the capacitance at the upper electrode reached a peak matches a time at which the capacitance at the lower electrode reached a peak.

An electrostatic sensor that achieves the above object includes an upper electrode arranged at a lower portion of a vehicle; a lower electrode arranged at the lower portion of the vehicle so as to be located downward in a gravitational direction from the upper electrode; and a detector configured to detect whether a foot-in-and-out operation is performed under the vehicle based on changes in capacitances at the upper electrode and the lower electrode. The lower portion of the vehicle includes an upper wall surface and a lower wall surface, an angle of the lower wall surface relative to a horizontal direction is smaller than an angle of the upper wall surface relative to the horizontal direction, a distance between the lower electrode and the lower wall surface is less than a distance between the upper electrode and the lower wall surface, and the detector is configured to determine that a foot-in-and-out operation has been performed under the vehicle when a reduction rate of the capacitance at the upper electrode matches a reduction rate of the capacitance at the lower electrode.

MODES FOR CARRYING OUT THE INVENTION

Figure 1:
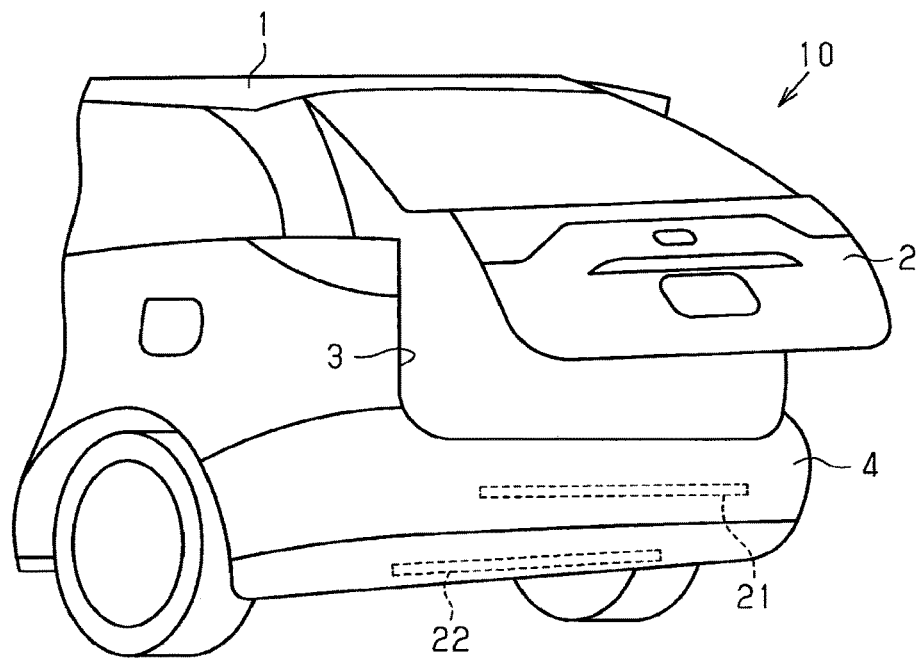
FIG. 1 is a perspective view showing a rear portion of a vehicle.
Figure 2A:
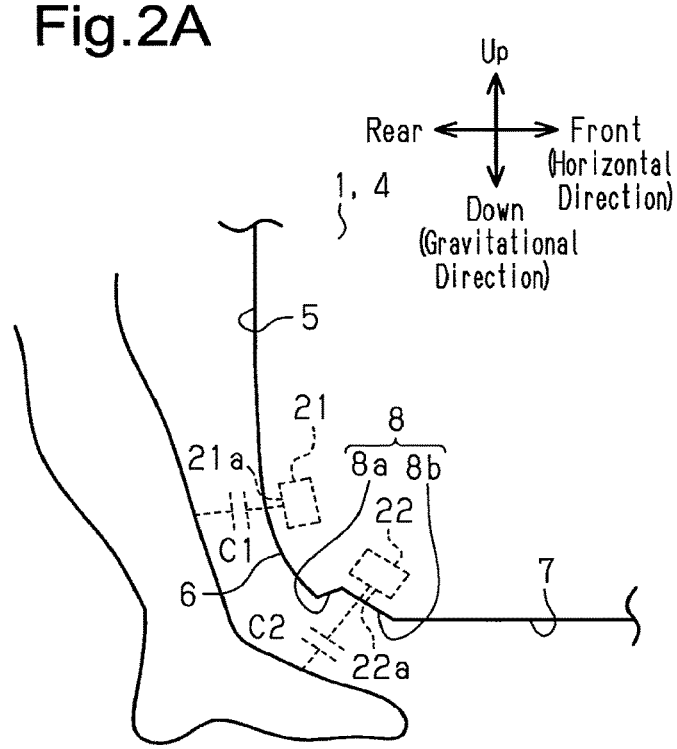
FIG. 2A is a side view showing a state in which a foot-in-and-out operation is performed under the vehicle.
Figure 2B:
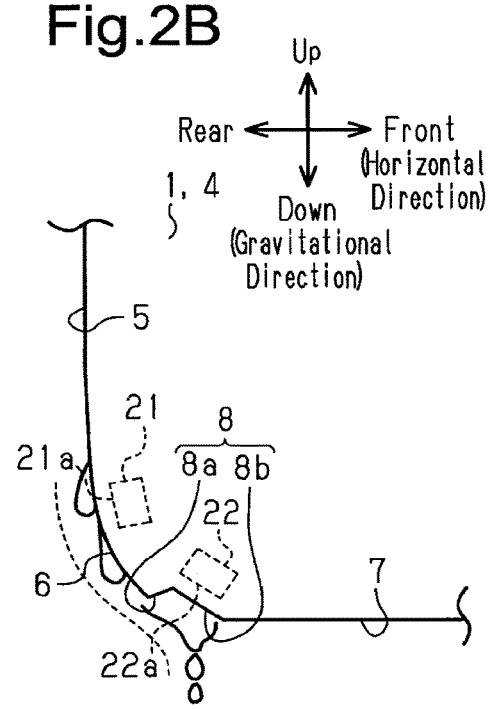
FIG. 2B is a side view showing a state in which water flows to a lower portion of the vehicle.

One embodiment of a back door opening and closing device that includes an electrostatic sensor will now be described with reference to the drawings.
As shown in FIG. 1, a rear portion of a vehicle 1 includes a back door 2 serving as an opening and closing subject. The vehicle 1 includes a back door opening and closing device 10. The back door opening and closing device 10 opens and closes a back door opening 3 by swinging the back door 2 about a hinge (not shown) arranged at an upper portion of the vehicle. The vehicle 1 includes a bumper 4 extending under the back door opening 3 in the vehicle width direction.
As shown in FIGS. 2A and 2B, the bumper 4 includes a vertical surface 5 extending in the gravitational direction, a curved surface 6 continuous with a lower edge of the vertical surface 5 and smoothly curved in the downward direction to gradually extend frontward, an inclined portion 8 continuous with a front edge of the curved surface 6, and a horizontal surface 7 continuous with a front edge of the inclined portion 8 and extending frontward in the horizontal direction. The inclined portion 8 is a surface directed downward and includes a first inclined surface 8a continuous with the curved surface 6, and a second inclined surface 8b connecting the first inclined surface 8a and the horizontal surface 7. The angle of the first inclined surface 8a relative to the horizontal direction is smaller than that of the vertical surface 5. The vertical surface 5 corresponds to an upper wall surface, the horizontal surface 7 corresponds to a lower wall surface, and the first inclined surface 8a corresponds to an inclined surface. The lower wall surface and the inclined surface are directed downward.

Figure 3:
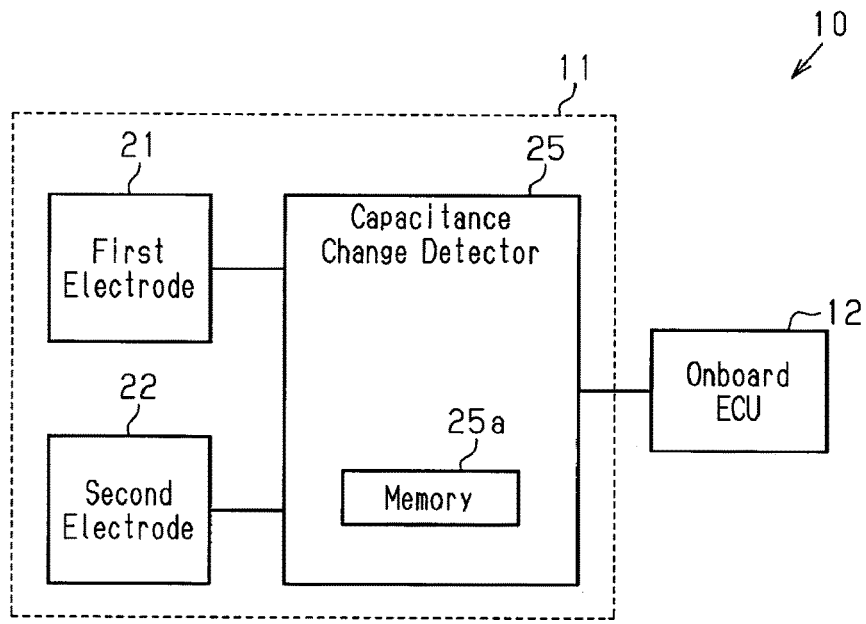
FIG. 3 is a block diagram showing the electric configuration of a back door opening and closing device.

As shown in FIG. 3, the back door opening and closing device 10 includes an electrostatic sensor 11 and an ECU 12. The electrostatic sensor 11 detects whether a foot-in-and-out operation is performed under the vehicle 1, more specifically, under the bumper 4, by detecting changes in capacitance at electrodes.

The ECU 12, which serves as a controller, swings the back door 2 by driving and controlling a motor (not shown) based on a detection result of the electrostatic sensor 11. As shown in FIGS. 1, 2A, 2B, and 3, the electrostatic sensor 11 includes a first electrode 21, a second electrode 22, and a capacitance change detector 25. The first electrode 21 and the second electrode 22 are arranged at an inner side of the bumper 4.

The first electrode 21 is a flat electrode extending in the vehicle width direction and arranged near the boundary between the vertical surface 5 and the curved surface 6. A flat surface 21a of the first electrode 21 is parallel to a tangent of the boundary between the vertical surface 5 and the curved surface 6. The flat surface 21a is substantially directed in the horizontal direction (slightly downward in the drawings).

The second electrode 22 is a flat electrode extending in the vehicle width direction and arranged near the inclined portion 8. A flat surface 22a of the second electrode 22 is parallel to a tangent of the boundary between the curved surface 6 and the horizontal surface 7. The flat surface 22a is directed obliquely downward.

Specifically, the second electrode 22 is located downward from the first electrode 21. Further, the inclination of the flat surface 22a of the second electrode 22 relative to the horizontal direction is smaller than the inclination of the flat surface 21a of the first electrode 21 relative to the horizontal direction. In other words, the inclination of the flat surface 21a of the first electrode 21 relative to the gravitational direction is smaller than the inclination of the flat surface 22a of the second electrode 22 relative to the gravitational direction. The distance between the second electrode 22 and the first inclined surface 8a is less than the distance between the first electrode 21 and the first inclined surface 8a. Further, the distance between the second electrode 22 and the horizontal surface 7 is less than the distance between the first electrode 21 and the horizontal surface 7. The first electrode 21 corresponds to an upper electrode and the second electrode 22 corresponds to a lower electrode.

The first electrode 21 and the second electrode 22 are electrically connected to the capacitance change detector 25. When an electric conductor is proximate to the first electrode 21, the capacitance of the first electrode 21 changes in accordance with the distance between the first electrode 21 and the electric conductor.

When the electric conductor is proximate to the second electrode 22, the capacitance of the second electrode 22 changes in accordance with the distance between the second electrode 22 and the electric conductor.

The capacitance change detector 25 determines whether a foot-in-and-out operation has been performed under the vehicle 1, more specifically, under the bumper 4 from changes in the capacitance over time at the first electrode 21 and the second electrode. The capacitance change detector 25 generates a determination signal containing information that shows a determination result.

The ECU 12 opens and closes the back door 2 based on the determination signal by driving the motor (not shown). The capacitance change detector 25 and the ECU 12 may include dedicated hardware (application specific integrated circuits: ASIC) that performs at least some of various types of processing. That is, the capacitance change detector 25 and the ECU 12 may be 1) one or more dedicated hardware circuits such as ASICs, 2) one or more processors (microcomputers) operating in accordance with computer programs (software), or 3) a circuit including a combination thereof.

The procedure of a determination process performed by the capacitance change detector 25 in relation to a foot-in-and-out operation under the vehicle 1 will now be described with reference to the flowchart shown in FIG. 5. A memory 25a arranged in the capacitance change detector 25 stores a program in advance, which performs the procedure of the process shown in the flowchart. The capacitance change detector 25 periodically performs the process shown in the flowchart of FIG. 5.

Figure 5:
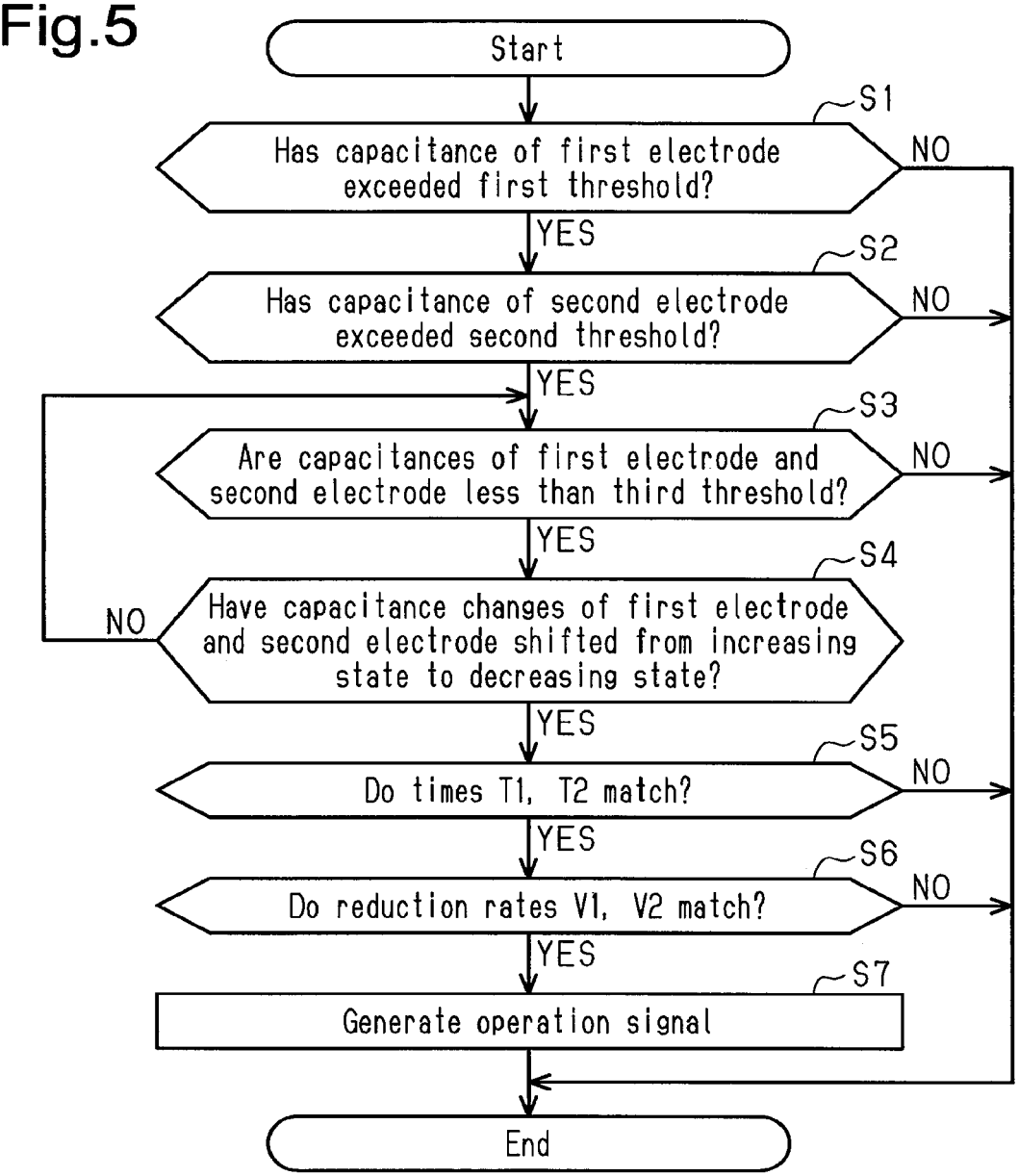
FIG. 5 is a flowchart showing the procedure of a process performed by a capacitance change detector.

As shown in FIG. 5, the capacitance change detector 25 first determines whether the capacitance of the first electrode 21 has exceeded a first threshold set in advance (step S1). In other words, in step S1, the capacitance change detector 25 determines whether the capacitance of a capacitor C1 (refer to FIG. 2A) formed between the first electrode 21 and an electric conductor proximate to the first electrode 21 has exceeded the first threshold.

In a case in which step S1 is YES, more specifically, if the capacitance of the first electrode 21 has exceeded the first threshold set in advance, the capacitance change detector 25 determines whether the capacitance of the second electrode 22 has exceeded a second threshold set in advance (step S2). In other words, in step S2, the capacitance change detector 25 determines whether the capacitance of a capacitor C2 (refer to FIG. 2A) formed between the second electrode 22 and the electric conductor proximate to the second electrode 22 has exceeded the second threshold. In the present embodiment, the second threshold is greater than the first threshold (refer to FIG. 4).

In a case in which step S2 is YES, more specifically, if the capacitance of the second electrode 22 has exceeded the second threshold set in advance, the capacitance change detector 25 determines whether the capacitances at the first electrode 21 and the second electrode 22 are less than a third threshold set in advance as an upper limit value (step S3).

In a case in which step S3 is YES, more specifically, if the capacitances at the first electrode 21 and the second electrode 22 are less than the third threshold, the capacitance change detector 25 determines whether capacitance changes at the first electrode 21 and the second electrode 22 have shifted from an increasing state to a decreasing state (step S4).

Figure 4:
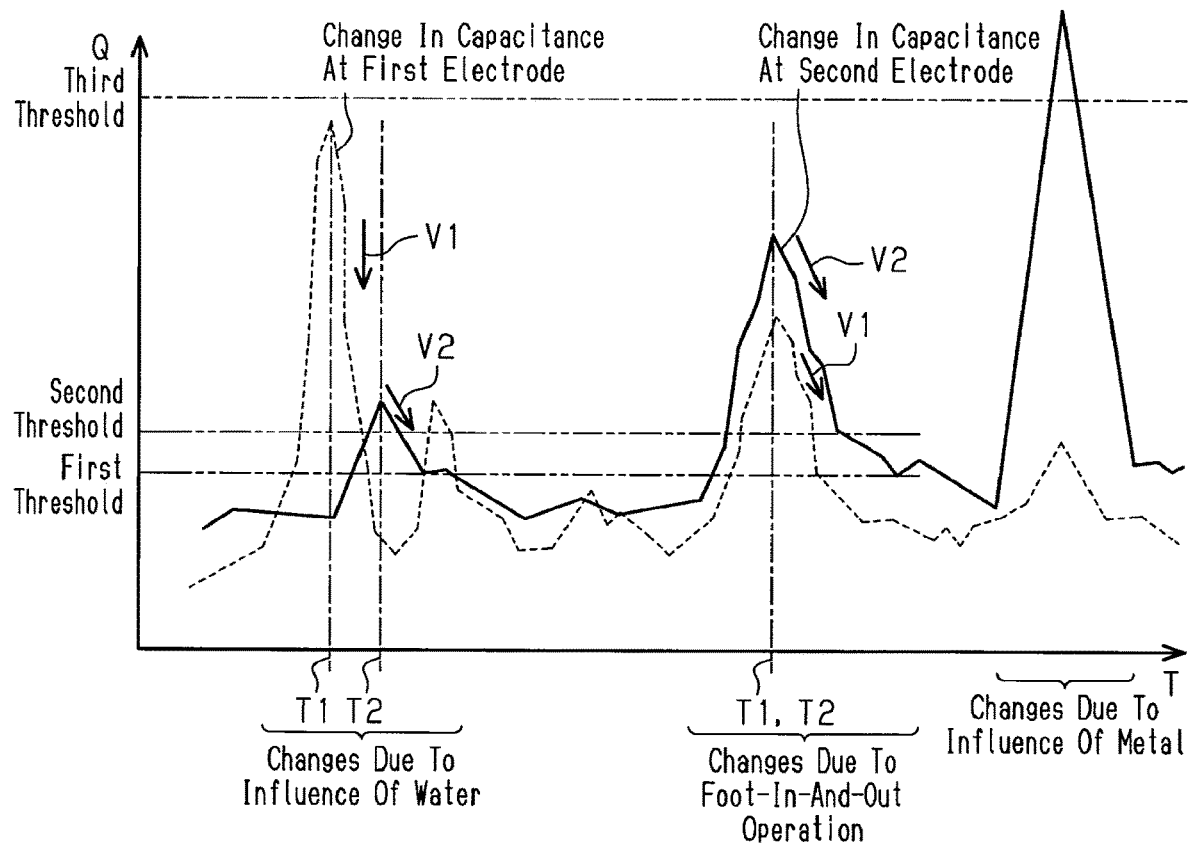
FIG. 4 is a timing chart showing an example of changes in capacitances at a first electrode and a second electrode when the capacitances at the first electrode and the second electrode are affected by a foot-in-and-out operation and water.

In a case in which step S4 is YES, more specifically, if capacitance changes at the first electrode 21 and the second electrode 22 have shifted from an increasing state to a decreasing state, the capacitance change detector 25 determines whether time T1 at which the capacitance of the first electrode 21 reached a peak matches time T2 at which the capacitance of the second electrode 22 reached a peak (step S5, refer to FIG. 4).

In a case in which step S5 is YES, more specifically, if time T1 at which the capacitance of the first electrode 21 reached a peak matches time T2 at which the capacitance of the second electrode 22 reached a peak, the capacitance change detector 25 determines whether reduction rate V1 of the capacitance of the first electrode 21 matches reduction rate V2 of the capacitance of the second electrode 22 (step S6).

In a case in which step S6 is YES, more specifically, if reduction rate V1 of the capacitance of the first electrode 21 matches reduction rate V2 of the capacitance of the second electrode 22, the capacitance change detector 25 generates an operation signal that indicates that a foot-in-and-out operation has been performed under the vehicle 1 (step S7) and ends the series of processes. The ECU 12 opens or closes the back door 2 by driving the motor (not shown) based on the operation signal.

In a case in which step S1 is NO, more specifically, if the capacitance of the first electrode 21 has not exceeded the first threshold set in advance, the capacitance change detector 25 ends the series of processes without generating the operation signal.

In a case in which step S2 is NO, more specifically, if the capacitance of the second electrode 22 has not exceeded the second threshold set in advance, the capacitance change detector 25 ends the series of processes without generating the operation signal.

In a case in which step S3 is NO, more specifically, if the capacitance at the first electrode 21 and the capacitance at the second electrode 22 are not less than the third threshold, the capacitance change detector 25 ends the series of processes without generating the operation signal.

In a case in which step S4 is NO, more specifically, if capacitance changes at the first electrode 21 and the second electrode 22 have not shifted from an increasing state to a decreasing state, the processing performed by the capacitance change detector 25 proceeds to step S3.

In a case in which step S5 is NO, more specifically, if time T1 at which the capacitance of the first electrode 21 reached a peak does not match time T2 at which the capacitance of the second electrode 22 reached a peak, the capacitance change detector 25 ends the series of processes without generating the operation signal.

In a case in which step S6 is NO, more specifically, if reduction rate V1 of the capacitance of the first electrode 21 does not match reduction rate V2 of the capacitance of the second electrode 22, the capacitance change detector 25 ends the series of processes without generating the operation signal.

The operation and advantages of the electrostatic sensor 11 will now be described.

The electrostatic sensor 11 includes the first electrode 21 and the second electrode 22, and the first electrode 21 is located upward from the second electrode 22.

Water flows downward from an upper side to a lower side because of gravity. Thus, if the capacitance of the first electrode 21 and the capacitance of the second electrode 22 are changed when affected by water, the capacitance of the second electrode 22 will change after the capacitance of the first electrode 21 changes. In other words, when the capacitances of the first electrode 21 and the second electrode 22 are affected by water, time T2 at which the capacitance of the second electrode 22 shifts from an increasing state to a decreasing state is later than time T1 at which the capacitance of the first electrode 21 shifts from an increasing state to a decreasing state as shown in the left side of FIG. 4.

In contrast, when the capacitances of the first electrode 21 and the second electrode 22 are affected by a foot because of a foot-in-and-out operation performed under the vehicle 1, times T1 and T2 match at which the capacitances of the first electrode 21 and the second electrode 22 shift from an increasing state to a decreasing state as shown in the right side of FIG. 4.

The capacitance change detector 25 of the electrostatic sensor 11 of this example monitors the time at which the capacitance changes at the first electrode 21 and the second electrode 22. Specifically, if time T1 at which the capacitance at the first electrode 21 shifts from an increasing state to a decreasing state matches time T2 at which the capacitance at the second electrode 22 shifts from an increasing state to a decreasing state, the capacitance change detector 25 determines that a foot-in-and-out operation has been performed under the vehicle 1. Thus, the capacitance change detector 25 determines whether changes in the capacitances at the first electrode 21 and the second electrode 22 are caused by water or a foot-in-and-out operation under the vehicle 1 in a preferred manner. That is, even if the vehicle is wetted, the capacitance change detector 25 detects a foot-in-and-out operation performed under the vehicle 1. In other words, the electrostatic sensor 11 easily detects a foot-in-and-out operation performed under the vehicle 1 regardless of the environment that the vehicle 1 is in.

In the electrostatic sensor 11 of the present example, the inclination of the flat surface 22a of the second electrode 22 relative to the horizontal direction is smaller than the inclination of the flat surface 21a of the first electrode 21 relative to the horizontal direction.

The flow rate of the water on the vertical surface 5 is higher than the flow rate of the water on the horizontal surface 7 because of gravity. Thus, when the capacitances of the first electrode 21 and the second electrode 22 are affected by water, the reduction rate of the capacitance at the first electrode 21 arranged near the vertical surface 5 is greater than the reduction rate of the capacitance at the second electrode 22 arranged near the horizontal surface 7. When a foot is moved under the vehicle 1, the reduction rate of the capacitance at the first electrode 21 matches the reduction rate of the capacitance at the second electrode 22.

The capacitance change detector 25 of the electrostatic sensor 11 of this example monitors the reduction rates of the capacitances at the first electrode 21 and the second electrode 22. Specifically, if the reduction rate of the capacitance at the first electrode 21 matches the reduction rate of the capacitance at the second electrode 22, the capacitance change detector 25 determines that a foot-in-and-out operation has been performed under the vehicle 1. Thus, the capacitance change detector 25 determines whether changes in the capacitances at the first electrode 21 and the second electrode 22 are caused by water or a foot-in-and-out operation performed under the vehicle 1 in a preferred manner. This allows the electrostatic sensor 11 to detect a foot-in-and-out operation performed under the vehicle 1 in a further ensured manner regardless of the environment in which the vehicle 1 is in.

The inclined portion 8 is arranged near the boundary of the curved surface 6 and the horizontal surface 7. The inclined portion 8 includes the first inclined surface 8a, which is continuous with the curved surface 6 and has an angle relative to the horizontal direction that is smaller than that of the vertical surface 5, and the second inclined surface 8b, which connects the first inclined surface 8a and the horizontal surface 7. The first inclined surface 8a reduces the flow rate of water in a further ensured manner. This easily produces a difference between the reduction rate of the capacitance at the first electrode 21 arranged near the vertical surface 5 and the reduction rate of the capacitance at the second electrode 22 arranged near the horizontal surface 7 when the capacitances of the first electrode 21 and the second electrode 22 are affected by water. Specifically, the reduction rate of the capacitance at the second electrode 22 is decreased from the reduction rate of the capacitance of the first electrode 21 in a further ensured manner. In other words, the reduction rate of the capacitance at the first electrode 21 is less likely to match the reduction rate of the capacitance at the second electrode 22. This improves accuracy when the capacitance change detector 25 determines a foot-in-and-out operation performed under the vehicle 1.

Further, as shown in FIGS. 2A and 2B, the angle between the first inclined surface 8a and the second inclined surface 8b is obtuse. Thus, the first inclined surface 8a and the second inclined surface 8b form a recess. Surface tension increases as surface area decreases. Specifically, water reaching the inclined portion 8 is likely to remain at the inclined portion 8 due to the increased surface tension at the corner formed by the first inclined surface 8a and the second inclined surface 8b. This reduces the flow rate of water at the inclined portion 8.

The capacitance change detector 25 is configured to determine the probability of the occurrence of a foot-in-and-out operation only if the capacitance of the first electrode 21 exceeds the first threshold and the capacitance of the second electrode 22 exceeds the second threshold.

This avoids a situation in which the capacitance change detector 25 determines that a foot-in-and-out operation has been performed under the vehicle 1 when a person merely passes by the side of the vehicle 1 or a small animal such as a cat passes under the vehicle 1.

If water collects on the bumper 4 over an extremely large area due to heavy rain or the like, or if a metal plate or a metal bar is proximate to the first electrode 21 and the second electrode 22, the capacitances at the first electrode 21 and the second electrode 22 would greatly exceed the capacitances in a case where a foot-in-and-out operation is performed under the bumper 4.

If the capacitances of the first electrode 21 and the second electrode 22 are not less than the third threshold, that is, if the capacitances of the first electrode 21 and the second electrode 22 are extremely large, the capacitance change detector 25 employed in the electrostatic sensor 11 of the present example determines that a foot-in-and-out operation has not been performed and does not execute subsequent processes (steps S4 to S7).

This allows the capacitance change detector 25 to determine that a foot-in-and-out operation has not been performed without determining whether times T1, T2 match at which the capacitances at the first electrode 21 and the second electrode 22 shift from an increasing state to a decreasing state and without determining whether the reduction rates V1, V2 match. That is, the capacitance change detector 25 can determine that a foot-in-and-out operation has not been performed at an earlier stage. Further, since steps S4 to S7 are not performed, the processing load of the capacitance change detector 25 is reduced.

The first threshold, the second threshold, and the third threshold may be changed in accordance with the attachment positions of the first electrode 21 and the second electrode 22 at the lower portion of the vehicle 1, the shape of an outer surface of the vehicle 1 in the periphery of the first electrode 21 and the second electrode 22, the assumed flow rate of water, the amount of water that collects on the outer surface of the vehicle, the assumed size of a small animal or metal bar, or the like.

The above embodiment may be modified as described below.

In the above embodiment, the first threshold and the second threshold may be a common value.

In the above embodiment, the capacitance change detector 25 periodically performs the processes shown in FIG. 5. Instead, the capacitance change detector 25 may perform the processes shown in FIG. 5 when the capacitance of the first electrode 21 exceeds the first threshold, which acts as a trigger.

The capacitance change detector 25 may perform the processes shown in FIG. 5 when the capacitance of the second electrode 22 exceeds the second threshold, which acts as a trigger, in addition to the capacitance of the first electrode 21 exceeding the first threshold.

In the above embodiment, the process in step S6, more specifically, the process of determining whether reduction rate V1 of the capacitance of the first electrode 21 matches reduction rate V2 of the capacitance of the second electrode 22 may be omitted from the series of processes shown in FIG. 5.

Figure 6:
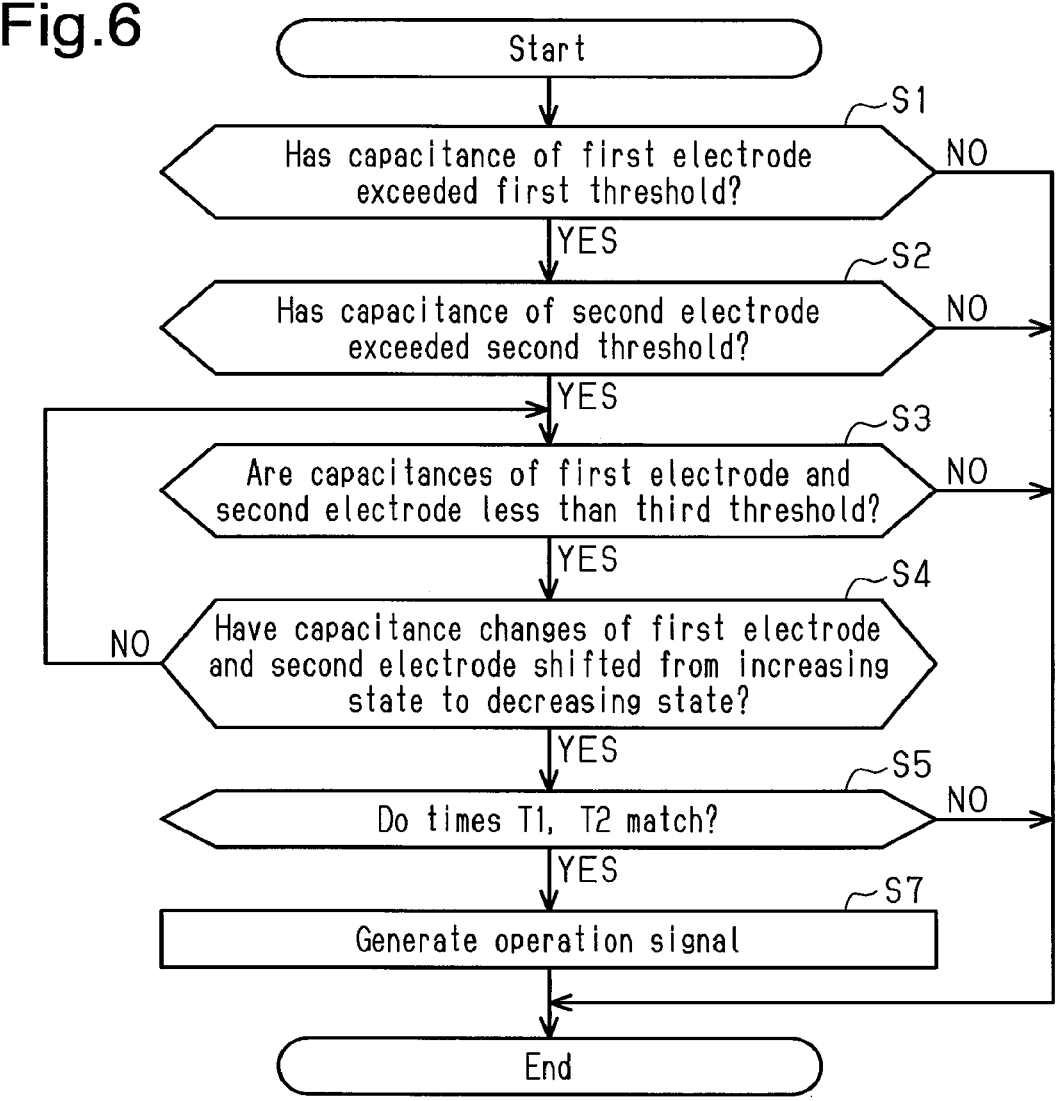
FIG. 6 is a flowchart showing another example of the procedure of a process performed by the capacitance change detector.

Specifically, as shown in FIG. 6, the capacitance change detector 25 performs steps S1, S2, S3, S4, S5, and S7. In a case in which step S5 is YES, more specifically, if time T1 at which the capacitance of the first electrode 21 reached the peak matches time T2 at which the capacitance of the second electrode 22 reached the peak, the capacitance change detector 25 proceeds to the process in step S7.

Even when configured in this manner, the capacitance change detector 25 can determine whether changes in the capacitances at the first electrode 21 and the second electrode 22 are caused by water or a foot-in-and-out operation by determining whether times T1, T2 match.

In this case, the inclination of the flat surface 22a of the second electrode 22 relative to the horizontal direction does not need to be smaller than the inclination of the flat surface 21a of the first electrode 21 relative to the horizontal direction. In this further example, the capacitance change detector 25 may further omit steps S3 and S4.

In the above embodiment, step S5, more specifically, the process of determining whether time T1 at which the capacitance of the first electrode 21 reached the peak matches time T2 at which the capacitance of the second electrode 22 reached the peak, may be omitted from the processing shown in FIG. 5.

Figure 7:
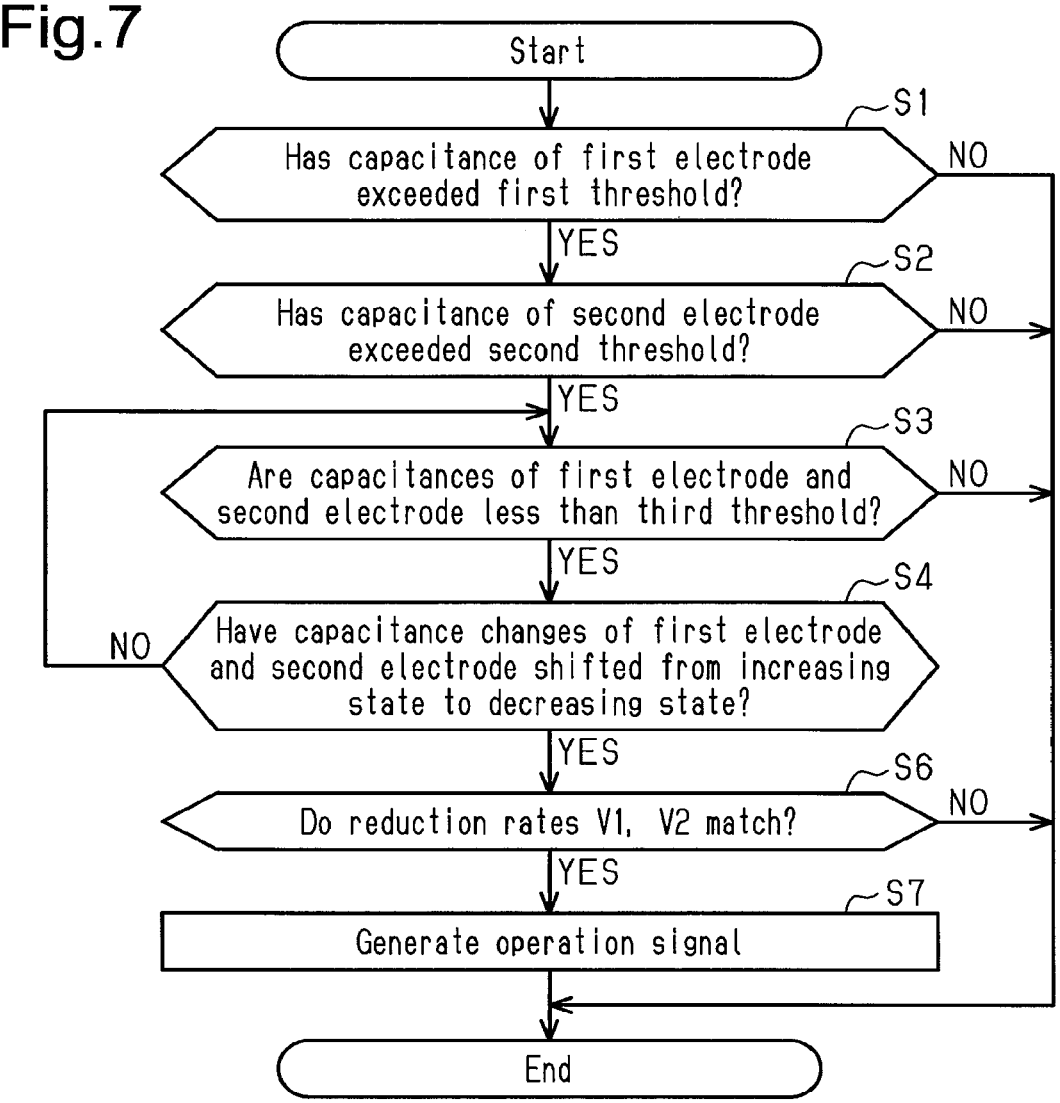
FIG. 7 is a flowchart showing another example of the procedure of a process performed by the capacitance change detector.

Specifically, as shown in FIG. 7, the capacitance change detector 25 performs the processes in steps S1, S2, S3, S4, S6, and S7. In a case in which step S4 is YES, more specifically, if the capacitance change detector 25 determines that capacitance changes at the first electrode 21 and the second electrode 22 have shifted from an increasing state to a decreasing state, the capacitance change detector 25 proceeds to the process in step S6.

Even when configured in this manner, the capacitance change detector 25 can determine whether changes in the capacitances at the first electrode 21 and the second electrode 22 are caused by water or a foot-in-and-out operation by determining whether reduction rates V1, V2 match. In this further example, the capacitance change detector 25 may further omit steps S3 and S4.

In the above embodiment, step S3, more specifically, the process of determining whether the capacitances at the first electrode 21 and the second electrode are less than the third threshold may be omitted from the series of processes shown in FIG. 5. In this case, step S4 is further omitted.

Figure 8:
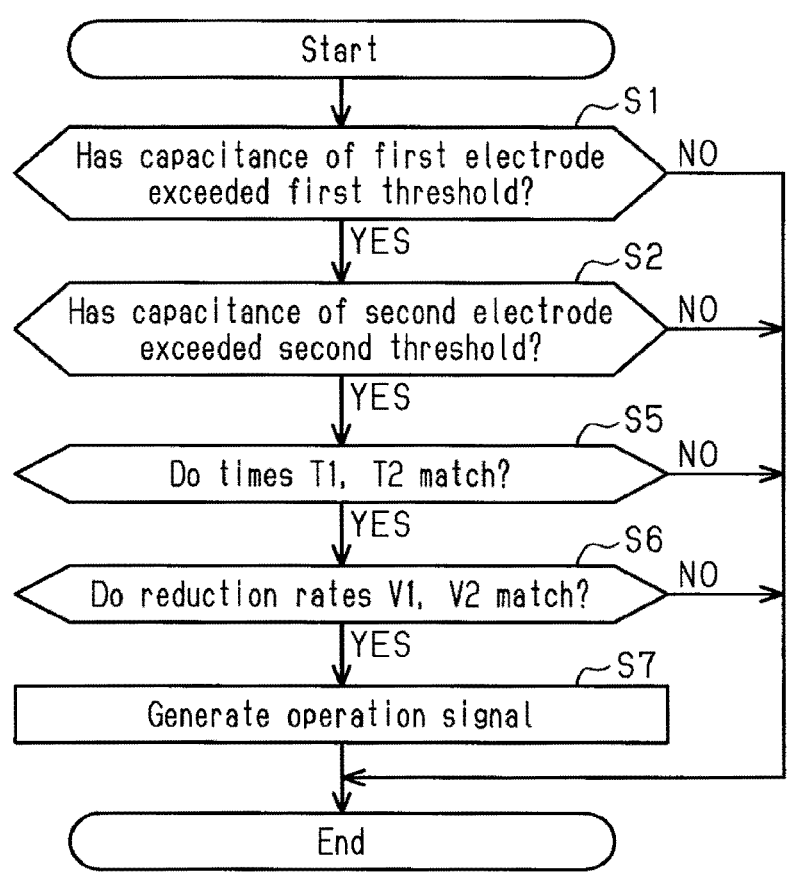
FIG. 8 is a flowchart showing another example of the procedure of a process performed by the capacitance change detector.

Specifically, as shown in FIG. 8, the capacitance change detector 25 performs the processes in steps S1, S2, S5, S6, and S7. In a case in which step S2 is YES, more specifically, if the capacitance change detector 25 determines that the capacitance of the second electrode 22 has exceeded the second threshold, the capacitance change detector 25 proceeds to the process in step S5.

Even when configured in this manner, the capacitance change detector 25 can determine whether changes in the capacitances at the first electrode 21 and the second electrode 22 are caused by water or a foot-in-and-out operation by determining whether times T1, T2 match and by determining whether reduction rates V1, V2 match. In this further example, the capacitance change detector 25 may further omit step S5 or step S6.

In the above embodiment, the matching of times T1, T2 is not limited to complete matching. A state in which time T2 is within a preset tolerable range with reference to time T1 may be included in the matching of times T1, T2.

In the above embodiment, the matching of reduction rates V1, V2 is not limited to complete matching. A state in which reduction rate V2 is within a preset tolerable range from reduction rate V1 may be included in the matching of reduction rates V1, V2.

In the above embodiment, the inclined portion 8 may be omitted. In other words, the horizontal surface 7 may be continuous with the front edge of the curved surface 6 without the inclined portion 8 located in between.

In the above embodiment, the first electrode 21 and the second electrode 22, which configure the electrostatic sensor 11, are arranged in the bumper 4. Instead, the first electrode 21 and the second electrode 22 may be arranged in a lower portion of the vehicle 1 at a location separate from the bumper 4.

For example, when the vehicle 1 has a side sliding door, it is desirable that the first electrode 21 and the second electrode 22 be provided on a step at a lower portion of the sliding door. In this case, it is desirable that the subject opened and closed by a foot-in-and-out operation performed under the vehicle 1 be the sliding door.

In this manner, the first electrode 21 and the second electrode 22, which configure the electrostatic sensor 11, are preferably arranged proximate to the opening and closing subject.

The invention claimed is:

1. An electrostatic sensor comprising:
an upper electrode arranged at a lower portion of a vehicle;
a lower electrode arranged at the lower portion of the vehicle so as to be located downward in a gravitational direction from the upper electrode; and
a detector configured to detect whether a foot-in-and-out operation is performed under the vehicle based on changes in capacitances at the upper electrode and the lower electrode, wherein
the lower portion of the vehicle includes an upper wall surface and a lower wall surface,
an angle of the lower wall surface relative to a horizontal direction is smaller than an angle of the upper wall surface relative to the horizontal direction,
a distance between the lower electrode and the lower wall surface is less than a distance between the upper electrode and the lower wall surface,
the detector is configured to determine that the foot-in-and-out operation has been performed when (a) a time at which the capacitance at the upper electrode reached a peak matches a time at which the capacitance at the lower electrode reached a peak and (b) a reduction rate of the capacitance at the upper electrode matches a reduction rate of the capacitance at the lower electrode,
the detector is configured not to determine that the foot-in-and-out operation has been performed when the time at which the capacitance at the upper electrode reached the peak does not match the time at which the capacitance at the lower electrode reached the peak, and
the detector is configured not to determine that the foot-in-and-out operation has been performed when the reduction rate of the capacitance at the upper electrode does not match the reduction rate of the capacitance at the lower electrode.

2. The electrostatic sensor according to claim 1, wherein
the lower portion of the vehicle includes the upper wall surface, an inclined surface, and the lower wall surface,
an angle of the inclined surface relative to a horizontal direction and an angle of the lower wall surface relative to the horizontal direction are smaller than an angle of the upper wall surface relative to the horizontal direction,
the inclined surface is arranged between the upper wall surface and the lower wall surface, and
a distance between the lower electrode and the inclined surface is less than a distance between the upper electrode and the inclined surface.

3. The electrostatic sensor according to claim 1, wherein the detector is configured to determine whether the foot-in-and-out operation has been performed when the capacitance at the upper electrode exceeds a first threshold, which is set in advance as a lower limit value for determining that a person is proximate, and the capacitance at the lower electrode exceeds a second threshold, which is set in advance as a lower limit value for determining that a person is proximate.

4. The electrostatic sensor according to claim 1, wherein the detector is configured to determine whether the foot-in-and-out operation has been performed when the capacitances at the upper electrode and the lower electrode are less than a threshold, which is set in advance as an upper limit value for determining that a person is proximate.

5. A vehicle opening and closing device comprising:
the electrostatic sensor according to claim 1; and
a controller configured to open and close an opening and closing subject installed in a vehicle when the electrostatic sensor detects a foot-in-and-out operation performed under the vehicle.

6. An electrostatic sensor comprising:
an upper electrode arranged at a lower portion of a vehicle;
a lower electrode arranged at the lower portion of the vehicle so as to be located downward in a gravitational direction from the upper electrode; and
a detector configured to detect whether a foot-in-and-out operation is performed under the vehicle based on changes in capacitances at the upper electrode and the lower electrode, wherein
the detector is configured to determine that the foot-in-and-out operation has been performed when a time at which the capacitance at the upper electrode reached a peak matches a time at which the capacitance at the lower electrode reached a peak,
the lower portion of the vehicle includes an upper wall surface, an inclined surface, and a lower wall surface.
an angle of the inclined surface relative to a horizontal direction and an angle of the lower wall surface relative to the horizontal direction are smaller than an angle of the upper wall surface relative to the horizontal direction, the inclined surface is arranged between the upper wall surface and the lower wall surface,
a distance between the lower electrode and the inclined surface is less than a distance between the upper electrode and the inclined surface,
the inclined surface is a first inclined surface,
the lower portion of the vehicle includes a second inclined surface connecting the first inclined surface and the lower wall surface,
an angle of the second inclined surface relative to the horizontal direction is smaller than an angle of the upper wall surface relative to the horizontal direction, and
the first inclined surface and the second inclined surface form a recess.

7. An electrostatic sensor comprising:
an upper electrode arranged at a lower portion of a vehicle,
a lower electrode arranged at the lower portion of the vehicle so as to be located downward in a gravitational direction from the upper electrode; and
a detector configured to detect whether a foot-in-and-out operation is performed under the vehicle based on changes in capacitances at the upper electrode and the lower electrode, wherein
the lower portion of the vehicle includes an upper wall surface and a lower wall surface,
an angle of the lower wall surface relative to a horizontal direction is smaller than an angle of the upper wall surface relative to the horizontal direction,
a distance between the lower electrode and the lower wall surface is less than a distance between the upper electrode and the lower wall surface, and
the detector is configured to determine that a foot-in-and-out operation has been performed under the vehicle when a reduction rate of the capacitance at the upper electrode matches a reduction rate of the capacitance at the lower electrode,
the lower portion of the vehicle includes an inclined surface between the upper wall surface and the lower wall surface,
an angle of the inclined surface relative to the horizontal direction is smaller than an angle of the upper wall surface relative to the horizontal direction,
a distance between the lower electrode and the inclined surface is less than a distance between the upper electrode and the inclined surface,
the inclined surface is a first inclined surface,
the lower portion of the vehicle includes a second inclined surface connecting the first inclined surface and the lower wall surface,
an angle of the second inclined surface relative to the horizontal direction is smaller than an angle of the upper wall surface relative to the horizontal direction, and
the first inclined surface and the second inclined surface form a recess.

* * * * *